(12) United States Patent
Dalla (10) Patent No.: US 11,088,613 B2
(45) Date of Patent: Aug. 10, 2021

(54) APPARATUSES AND METHODS OF MINIMIZING INRUSH

(71) Applicant: California Eastern Laboratories, Inc., Santa Clara, CA (US)

(72) Inventor: Christopher C. Dalla, Westminster, CO (US)

(73) Assignee: California Eastern Laboratories, Inc., Santa Clara, CA (US)

(\*) Notice: Subject to any disclaimer, the term of this patent is extended or adjusted under 35 U.S.C. 154(b) by 233 days.

(21) Appl. No.: 16/550,562

(22) Filed: Aug. 26, 2019

(65) Prior Publication Data

US 2020/0076296 A1 Mar. 5, 2020

Related U.S. Application Data

(60) Provisional application No. 62/725,795, filed on Aug. 31, 2018.

(51) Int. Cl.
*H02M 1/32* (2007.01)
*H02M 3/158* (2006.01)
*H02H 1/04* (2006.01)
*H02H 9/00* (2006.01)

(52) U.S. Cl.
CPC .............. *H02M 1/32* (2013.01); *H02H 1/043* (2013.01); *H02H 9/002* (2013.01); *H02M 3/158* (2013.01)

(58) Field of Classification Search
CPC ........ H02M 1/32; H02M 3/158; H02H 1/043; H02H 9/002
See application file for complete search history.

(56) References Cited

U.S. PATENT DOCUMENTS

| 5,675,221 A * | 10/1997 | Yoo ...................... H05B 47/185 315/291 |
| 5,838,077 A | 11/1998 | Chelcun et al. |
| 9,991,075 B2 | 6/2018 | Lenig et al. |
| 10,117,297 B1 * | 10/2018 | Wu ......................... H05B 45/10 |
| 10,511,307 B2 * | 12/2019 | Flipo ..................... G06F 1/3243 |
| 2014/0320007 A1 * | 10/2014 | Stamm ................... H05B 45/44 315/51 |
| 2016/0118906 A1 * | 4/2016 | Freeman ........... H02M 3/33515 363/21.05 |
| 2019/0245537 A1 * | 8/2019 | Hu ......................... H03K 17/68 |

\* cited by examiner

*Primary Examiner* — Scott Bauer
(74) *Attorney, Agent, or Firm* — Richard W. James (57) ABSTRACT

An apparatus and method for minimizing inrush power. The method includes transmitting a load energization signal from a primary microcontroller to a logic latch or secondary microcontroller, transmitting a zero-cross voltage signal from a zero-cross sensor coupled to the load power to the logic latch or secondary microcontroller, and transmitting an energize signal from the logic latch or secondary microcontroller to a relay after the receipt of an energize signal from the primary microcontroller and after receipt of a zero-cross signal.

20 Claims, 5 Drawing Sheets

APPARATUSES AND METHODS OF MINIMIZING INRUSH

CROSS-REFERENCE TO RELATED APPLICATIONS

The present application claims priority to U.S. provisional patent application Ser. No. 62/725,795, filed Aug. 31, 2018, which is incorporated herein in its entirety.

FIELD OF THE INVENTION

This invention is related to switching electrical loads, including commercial and industrial light fixtures, while minimizing electrical inrush when the load is energized and more particularly to apparatuses and methods for energizing a load at a zero-crossing.

BACKGROUND OF THE INVENTION

When electrical loads are energized, inrush power consumption is typically greater, sometimes several times greater, than steady-state current drawn by the same load. This high inrush current creates stress on equipment used to switch the load, as well as on the facility or equipment generating the electricity.

Many electrical loads experience electrical inrush when energized. Electrical inrush is a higher electrical draw than would be drawn during normal operation and that occurs for a short time when the electrically powered device is initially energized. For example, certain types of light fixtures, including fluorescent light fixtures that use electronic ballasts to drive the actual lamps, experience an electrical inrush when power is first applied to these ballasts. This excessive current may be referred to as "inrush current," and although the amount of time that this excessive current is being drawn is very short (often less than 0.1 seconds), it is problematic because the stresses that it creates may require the use of components that are excessively rated in order to withstand the inrush current, and/or may require a reduction in the number of fixtures that can be controlled by a single device so as to limit the total amount of inrush current. However, if the inrush current can be minimized (or, ideally, eliminated), then the reliability of the controlling device can be increased. In addition, if the inrush current can be minimized, the total number of fixtures that can be controlled by a single device may be increased, thereby reducing cost.

Accordingly, there is a need for device methods, apparatuses, and systems that reduce or otherwise control inrush current occurring upon electronic ballast or alternating-current motor energization.

BRIEF DESCRIPTION OF THE DRAWINGS

The accompanying drawings, wherein like reference numerals are employed to designate like components, are included to provide a further understanding of wireless luminaire control apparatuses and methods, are incorporated in and constitute a part of this specification, and show embodiments of those apparatuses and methods that together with the description serve to explain those apparatuses and methods.

Various other objects, features and advantages of the invention will be readily apparent according to the following description exemplified by the drawings, which are shown by way of example only, wherein.

SUMMARY OF THE INVENTION

In an embodiment, an inrush power reduction device includes a primary microcontroller, a secondary microcontroller, a relay, and a zero-cross voltage sensor. The primary microcontroller includes an energize output, a de-energize output, and a clock output. The secondary microcontroller includes an energize input coupled to the primary microcontroller energize output, a clock input coupled to the primary microcontroller clock output, a zero-cross input, and a load energize output. The relay is coupled to the de-energize output of the primary microcontroller and the energize output of the secondary microcontroller, and is also coupled to energize a load. The zero-cross voltage sensor is coupled to the power provided to the load and senses the voltage of that power provided to the load and provides an output indicative of a low voltage on the load power, the output coupled to the zero-cross input of the secondary microcontroller.

In another embodiment, an inrush power reduction device includes a microcontroller, a logic latch, a relay, and a zero-cross voltage sensor. The microcontroller in that embodiment has a latch activation output, a load energization output, and a load de-energization output. The logic latch has an activation input coupled to the primary microcontroller latch activation output, a load energization input coupled to the primary microcontroller load energization output, having a zero-cross input, and having a load energization output. The relay is coupled to the de-energization output of the primary microcontroller and the energization output of the secondary microcontroller, and is to be coupled to energize a load. The zero-cross voltage sensor is to be coupled to sense the voltage of power provided to the load and provide an output indicative of a low voltage on the load power. The voltage sensor further includes an output coupled to the zero-cross input of the logic latch.

A method of controlling power inrush to a load is also provided. That method includes transmitting a load energization signal from a primary microcontroller to a secondary microcontroller, transmitting a zero-cross voltage signal from a zero-cross sensor coupled to the load power to the secondary microcontroller, and transmitting an energize signal from the secondary microcontroller to a relay after the secondary microcontroller receives an energize signal from the energize output of the primary microcontroller, after the secondary microcontroller receives a zero-cross signal from the zero-cross voltage sensor, and prior to the later zero-cross low voltage event by an amount of time it takes for a load to energize from the time the load energize output is set.

Other embodiments, which may include one or more portions of the aforementioned apparatuses and methods or other parts or elements, are also contemplated, and may have a broader or different scope than the aforementioned apparatus and method. Thus, the embodiments in this Summary of the Invention are mere examples, and are not intended to limit or define the scope of the invention or claims.

DETAILED DESCRIPTION

Reference will now be made to embodiments of apparatuses and methods of minimizing inrush power, examples of which are shown in the accompanying drawings. Details, features, and advantages of inrush minimizing apparatuses and methods of use will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification do not necessarily all refer to the same embodiment. References to "or" are furthermore intended as inclusive, so "or" may indicate one or another of the ored terms or more than one ored term.

Figure 1:
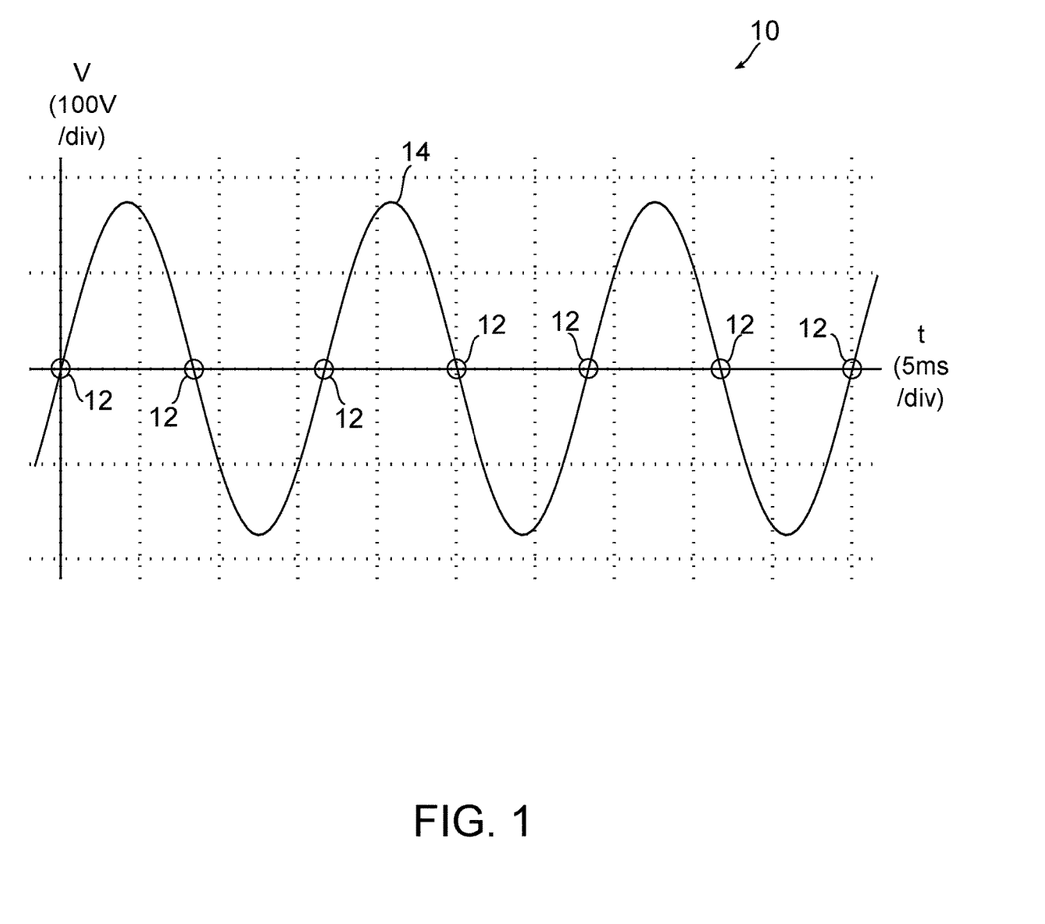
FIG. 1 illustrates zero-crossing points in an alternating current diagram.

FIG. 1 illustrates voltage zero-crossing points in a diagram of voltage in an alternating current system 10 with voltage zero-crossing points 12 circled. The current illustrated by the sine wave 14 of FIG. 1 is for a typical North American power system operating at approximately 120 volts and approximately a 60 hertz frequency.

The inrush minimizing apparatuses and methods described herein limit inrush current by ensuring that the connection between the fixture and the power source is established as near as possible to a "zero-crossing"—that is, the moment in the alternating current cycle when the voltage transitions from positive to negative or from negative to positive.

Because of the power formula P=I*V (derived from Joule's first law), it follows that if V=0, the value of I is irrelevant, since the amount of power transferred, P, becomes zero. If V is very small, the effect is similarly low power draw, since P becomes very small. The desire, therefore, is to ensure that whatever component (relay, TRIAC, etc.) is used to enable the flow of power to the fixture is activated as near to a zero-crossing as possible, causing the inrush current to the fixture to be limited by the rising magnitude of the line voltage.

Approaches to this problem disclosed herein involve the use of a zero-crossing detector of some sort. There are a variety of approaches to the detection of a zero-crossing, therefore, no specific zero-crossing detection circuit will be detailed herein. Instead, all circuits shown here will simply be shown as having an input labelled "zero-cross," which may be viewed by a processor or microcontroller as a logical "1" when the line voltage is at or near zero volts, and a logic "0" at all other times. In addition, for the sake of simplicity, the control component in all examples provided here will be a relay, though devices other than a relay may be employed in place of the relay.

Figure 2:
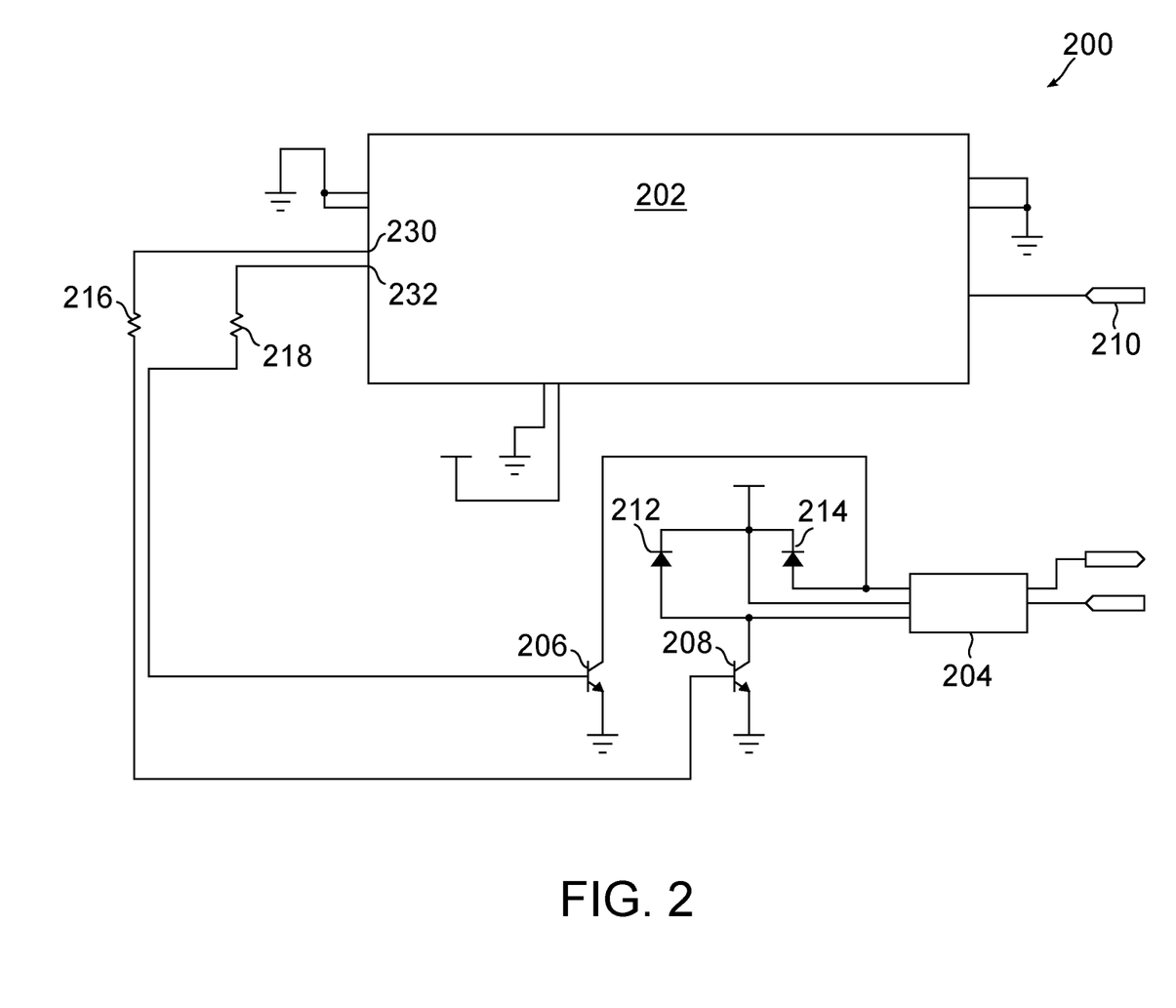
FIG. 2 illustrates an embodiment of a microcontroller zero-cross controlled inrush minimizing apparatus.

FIG. 2 illustrates a microcontroller zero-cross controlled embodiment of an inrush minimizing apparatus 200. In that embodiment, the zero-cross voltage signal is fed directly into the system microcontroller, where it is used to activate a relay that energies the electrical motor or other load at or near the time of the zero-cross low voltage event.

The apparatus of FIG. 2 includes a microcontroller 202 coupled to a relay 204 through a pair of NPN transistors 206 and 208, a pair of diodes 212 and 214 and a pair of resistors 216 and 218. The relay 204 may be coupled to a 120V or other line voltage that may energize the load directly or may be used to energize a contactor or other apparatus for energizing the load. The microcontroller 202 is also coupled to a zero-cross sensor 210 coupled to the power source to the load to provide the microcontroller 202 with a signal that indicates when that alternating current power source experiences a zero-voltage crossing.

The zero-crossing signal may be a logic high ("1") when the voltage of the AC source is at or near zero and a logic low ("0") at all other times.

In certain embodiments, the microcontroller incorporates or otherwise interfaces with firmware that activates the relay that energizes or de-energizes the load.

This application has two significant advantages. The first significant advantage is that the only required external circuitry is the zero-cross circuit, which minimizes components, complexity, and cost. The second advantage is that the behavior of the zero-cross circuit and the relay can be characterized to learn the temporal relationship between the leading edge of the zero-cross signal and the actual moment of zero crossing as well as the temporal relationship between the leading edge of a set pulse and the moment when the relay contacts actually close. By timing the microcontroller pulse to the set terminal of the relay, the microcontroller can cause the moment of contact closure to occur within a few tens of a microsecond of the zero crossing.

A disadvantage to the inrush minimizing apparatus illustrated in FIG. 2 may exist where there are processes that run on the system microcontroller that are unblockable (such as a complex wireless networking stack). In such a situation, the actual timing of the set pulse relative to the zero-cross pulse cannot be guaranteed, since the wireless networking stack could interrupt the "switch the power on" process in between the detection of the zero-cross pulse and the application of the set pulse, thereby disrupting any characterization-based timing, and opening the possibility that the relay could actually be closed at or near a voltage peak on the line power, which could be disastrous.

Figure 3:
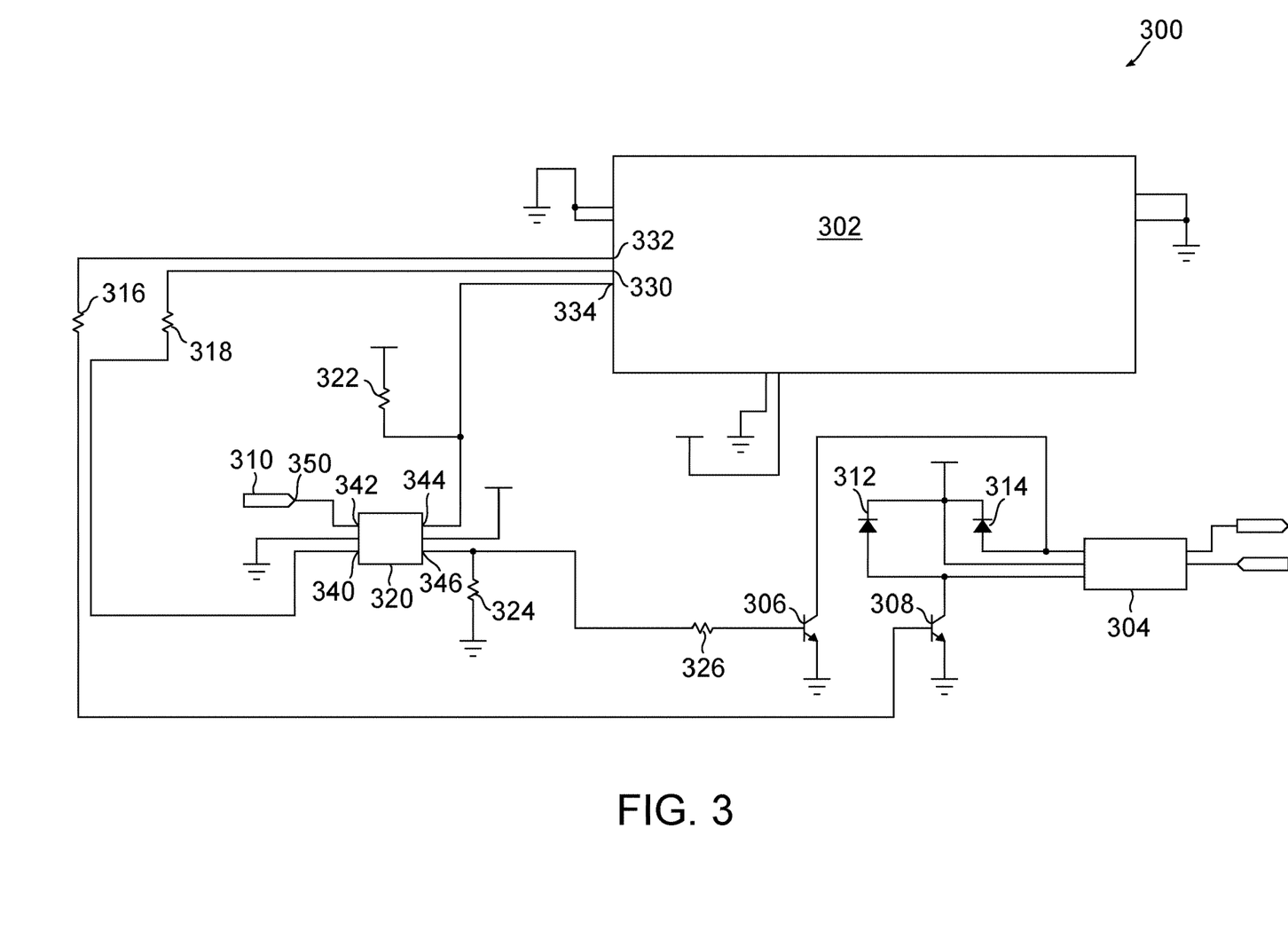
FIG. 3 illustrates another embodiment of a microcontroller zero-cross controlled inrush minimizing apparatus.

FIG. 3 illustrates an embodiment of a second variant of an inrush minimizing apparatus 300. The inrush minimizing apparatus 300 of FIG. 3 includes a microcontroller 302 coupled to a logic latch 320 that accepts an "on" command from the microcontroller 302, but does not energize a relay 304 to energize the load until the next zero-crossing following the on command from the microcontroller 302. The logic latch 320 is also coupled to a zero-cross sensor 310 such that the logic latch 320 will not energize the relay 304 until it receives an on signal from the microcontroller 302 and a signal indicating a zero-cross from the zero-cross sensor 310. The logic latch 320 will de-energize the relay 304 when commanded to de-energize the load by the microcontroller 302.

The apparatus of FIG. 3 includes the microcontroller 302 coupled to the logic latch 320, which in turn is coupled to the relay 304 through a pair of NPN transistors 306 and 308, a pair of diodes 312 and 314 and resistors 316, 318, 322, 324, and 326. The relay 304 may be coupled to a 120V or other line voltage that may energize the load directly or may be used to energize a contactor or other apparatus for energizing the load. The logic latch 320 is also coupled to a zero-cross sensor 310 coupled to the power source for the load to provide the logic latch 320 with a signal that indicates when that alternating current power source experiences a zero-voltage crossing.

In the FIG. 3 inrush minimizing apparatus 300, the logic latch 320 is a significant addition to the apparatus described in connection with FIG. 1. The combination of the zero-cross sensor 310 and the logic latch 320 in the inrush minimizing apparatus 300 circuit 301 allows the microcontroller 302 to apply a load energization command signal asynchronously relative to a zero-crossing, yet still assures that the relay 304 will only close at or near an alternating current voltage zero-crossing where voltage is at or near zero volts. In that embodiment, the logic latch 320 may be a typical D latch. A microcontroller 302 energization signal is coupled from a load energization output 330 to a load energization input 340 (which may be a data (D) input) of the logic latch 320 and a latch output activation signal is coupled from a latch activation output 334 of the microcontroller 302 to a latch activation input 344 (which may be an output enable not (OE/) of a D latch) of the logic latch 320 as desired. An output 350 that indicates a no voltage state on the power to the load from the zero-cross sensor 310 is coupled to a zero-cross input 342 (which may be a latch enable (LE) input of a D latch) of the logic latch 320. A relay output 346 of the logic latch 320 energizes the relay 304 when the logic latch 320 receives an energize command transmitted from the microcontroller 302 load energization output 330 at the logic latch 320 load energization input 340, when a latch output activation signal is not transmitted from the microcontroller 302 latch activation output 334, and when the zero-cross sensor 310 transmits a low or no voltage signal to the logic latch 320 zero-cross input 342.

In an embodiment, the microcontroller 302 may hold the load energization command signal low and hold the latch output activation signal high in a normal off-mode in which the relay 304 is open to de-energize the load. The load energization command signal may be incident at microcontroller load energization output 330 and the latch output activation signal may be incident at microcontroller latch activation output 334. The latch output activation signal may also be referred to as an output enable not (OE\) command. In the embodiment illustrated in FIG. 3, that signal arrangement allows the resistor 324 to pull the base of transistor Q1 low, preventing the relay 304 from closing its contacts.

When the microcontroller 302 commands the relay 304 to close its contacts, thereby energizing the load coupled to the contacts, the microcontroller 302 may assert a low level on the latch 320 activation input 344, and assert a high level on the latch 320 load energization input 340. In certain embodiments, the microcontroller 302 may first assert the low level on the latch activation input 344 and then, a few microseconds later, assert the high level on the latch 320 load energization input 340. Then, if a zero-voltage condition is not sensed and, therefore, a zero-cross signal is not being asserted at zero-cross sensor 310 output 350 to the latch 320 zero-cross input 342, the latch 320 will output a low level on the relay control output 346. That low-level output may have been latched due to the set signal having been low the last time the zero-cross signal was asserted and the relay 304 will not close. If a zero-voltage condition does exist, a zero-cross signal will be asserted from zero-cross sensor 310 output 350 to the latch 320 zero-cross input 342, thereby causing the latch 320 to output a high level on the relay control output 346, causing the relay 304 contacts to close, as desired, since the line power signal as at or near a zero-crossing. That high level may be latched in certain embodiments or the relay 304 may latch when it receives that highsignal.

In an embodiment wherein the relay illustrated in FIG. 3 is a latching relay, the microcontroller 302 may assert a high signal at its latch activation output 334, which is coupled to latch activation input 344 of the logic latch 320. After a delay that may be equal to some whole number of line power cycles or half cycles, the microcontroller 302 may assert a high signal at its load energization output 330, which is coupled to a load energization input 340 of the logic latch 320. The relay control output 346 of the logic latch 320 will then go into a high-impedance state, allowing the resistor 316 to pull down the base of the transistor 306, thereby ceasing the set signal to the relay, which, being a latching relay, will remain closed until a reset signal is asserted by the microcontroller 302 by asserting a high signal at its load de-energization output 332, which is coupled to a reset input of the relay 304. After the high signal is transmitted from the microcontroller 302 de-energization output 332 to the relay 304, the microcontroller 302 may assert a low signal on the logic latch energization input, preparing the logic latch 320 for the next set cycle.

This second variant of an inrush minimizing apparatus 300, illustrated in FIG. 3, and its method of use have advantages that include working in a system that uses an unblockable wireless networking stack, and also of being relatively low-cost. A potential issue with this second variant of an inrush minimizing apparatus 300 and its method of use is that the temporal relationship between the actual closure of the relay contacts and the assertion of the zero-cross signal could be challenging to control precisely, though some measure of control precision might be achievable through careful design of the zero-crossing detection circuit.

Figure 4:
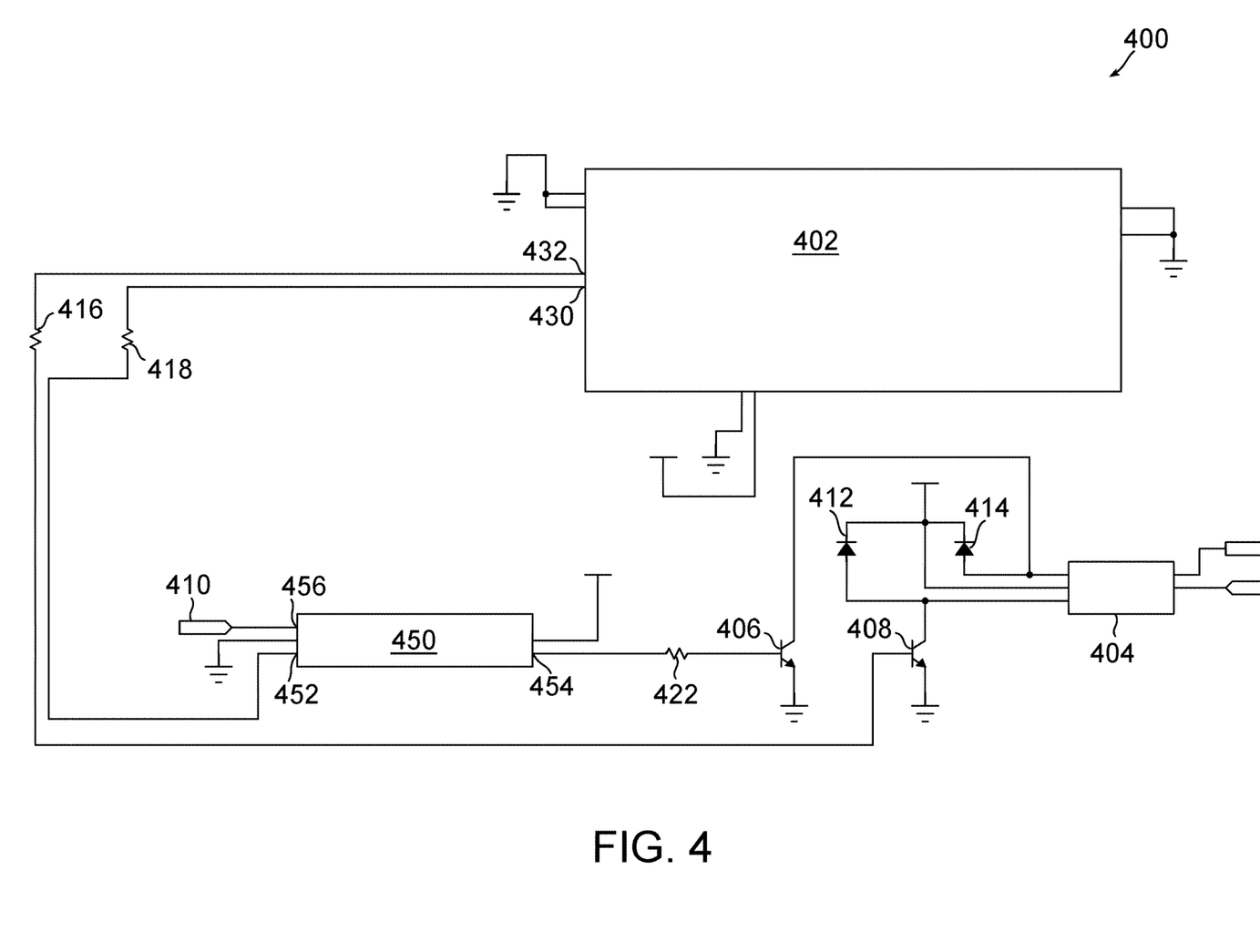
FIG. 4 illustrates yet another embodiment of a microcontroller zero-cross controlled inrush minimizing apparatus.

FIG. 4 illustrates a third embodiment of an inrush minimizing apparatus 400. This third variant adds a secondary microcontroller 450 and eliminates the latch 320 used in the second variant, which is illustrated in FIG. 3. The secondary microcontroller 450 in this embodiment can defer the arrival of the set signal from the microcontroller 402 such that the set signal arrives at the relay 404 at a time that causes the closure of the relay 404 contacts to occur at or near a zero-crossing of the load power.

The inrush minimizing apparatus 400 of FIG. 4 includes a primary microcontroller 402 coupled to a secondary microcontroller 450 that delays action on an "on" command from the microcontroller 402 until the next zero-crossing following the on command from the microcontroller 402. The secondary microcontroller 450 is coupled to a zero-cross sensor 410 such that the secondary microcontroller 450 will not energize the relay 404 until it receives an on signal from the microcontroller 402 and a signal indicating a zero-cross from the zero-cross sensor 410.

De-energizing the relay 404 is accomplished by way of a reset signal transmitted from the microcontroller 402 de-energize output 432 to the relay 404.

The apparatus 400 of FIG. 4 includes the primary microcontroller 402 coupled to the secondary microcontroller 450 through resistor 418, the secondary microcontroller 450 in turn being coupled to the relay 404 through a transistor 406, a pair of diodes 412 and 414, and a resistor 422. The primary microcontroller 402 is also coupled to the relay 404 through transistor 408 and a resistor 416. The relay 404 may be coupled to a 120 VAC power source or other line voltage that may energize the load directly or may be used to energize a contactor or other apparatus for energizing the load. The secondary microcontroller 450 is also coupled to a zero-cross sensor 410 coupled to the power source for the load to provide the secondary microcontroller 450 with a signal that indicates when that alternating current power source experiences a zero-voltage crossing.

In the inrush minimizing apparatus 400 illustrated in FIG. 4, the primary microcontroller 402 asserts a set signal at its load energization output 430. That set signal is received by the secondary microcontroller 450 at its load energization input 452. The secondary microcontroller 450 does not, however, assert the set signal to the relay 404 (or to the base of transistor 406) from the secondary microcontroller 450 energization output 454 until some time, which may be a number of microseconds, after the leading edge of a zero-cross signal is received from a zero-cross sensor 410 at a zero-cross input 456 of the secondary microcontroller 450. The secondary microcontroller 450 sends a relay actuation signal at a time such that the relay 404 contacts close at or near to a zero-crossing. The time the secondary microcontroller 450 waits before sending an actuation signal to the relay 404 may be a half AC cycle period (or half of a whole number of AC cycle periods) minus an actuation delay time. The actuation delay time may thus be the time it takes for the relay 404 contacts to close in response to a signal being sent from the secondary microcontroller 450.

This third embodiment of an inrush minimizing apparatus 400 works in various load energization systems including systems where the system or primary microcontroller 402 is running unblockable processes, but has the additional benefit that because the secondary microcontroller 450 can assert its outputs against a very granular time base (probably at intervals of one microsecond or less), through characterization of the zero-cross signal and the behavior of the relay 404, closure of the relay 404 contacts within 20 microseconds of a zero-crossing should be achievable.

A potential disadvantage of this third embodiment of an inrush minimizing apparatus 400 is higher cost than the first 200 and second 300 embodiments. Although the component count for this third embodiment inrush minimizing apparatus 400 is low, a simple MCU that may be used as the secondary microcontroller 450 in this third embodiment may be more costly than the logic latch 320 of the second inrush minimizing apparatus 300.

In the third embodiment of the inrush minimizing apparatus 400, the relay 404 closure timing may be provided by using an ultra-miniature microcontroller as the secondary microcontroller 450 with an internal oscillator. Because some such internal oscillators are prone to drift, especially when they are placed in various ambient temperatures, the third embodiment inrush minimizing apparatus 400 illustrated in FIG. 4 may not precisely ensure that the relay 404 contact closure occurs as near to the zero-crossing as desired to sufficiently reduce the inrush current.

Figure 5:
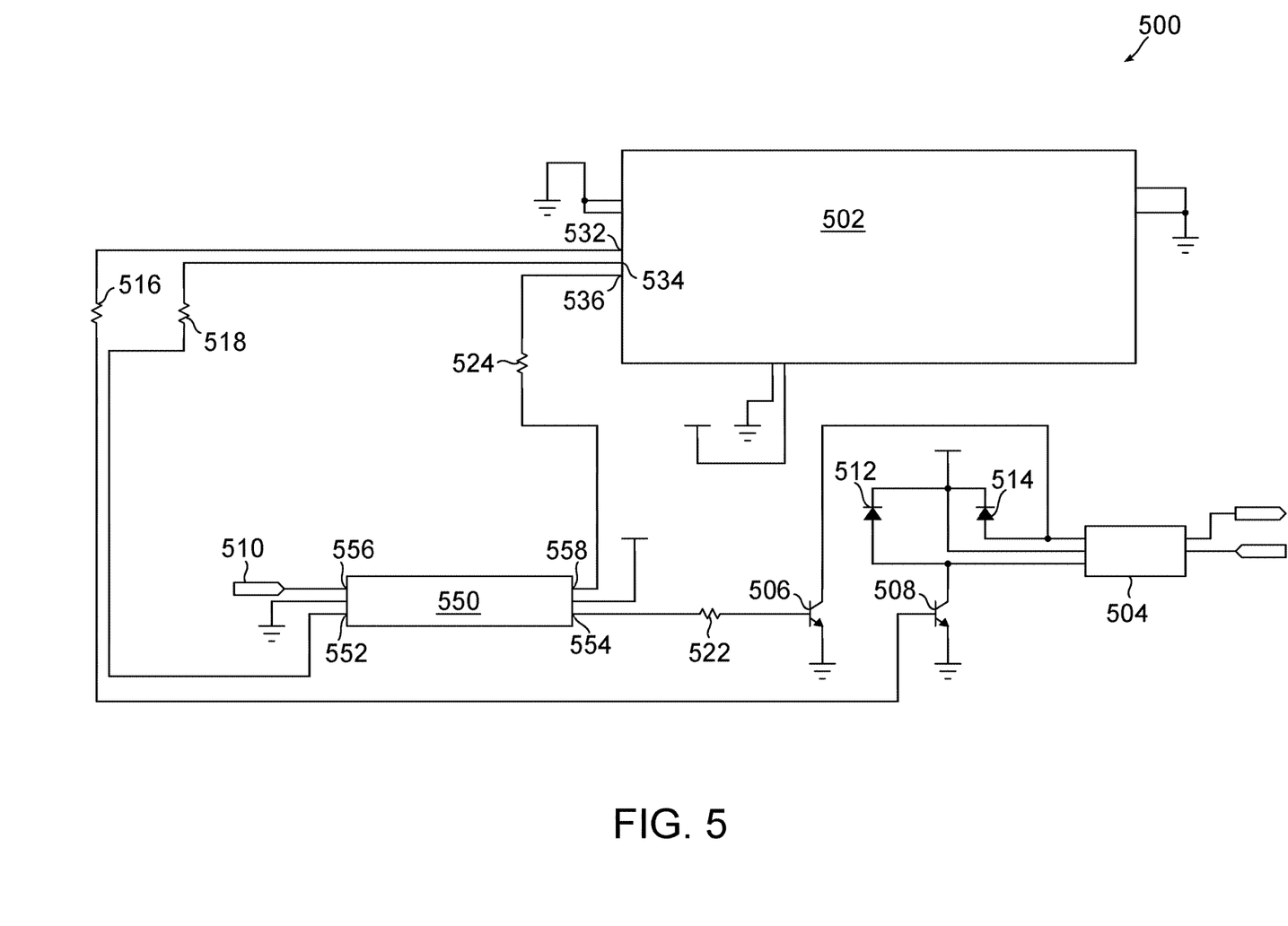
FIG. 5 illustrates another embodiment of a microcontroller zero-cross controlled inrush minimizing apparatus.

FIG. 5 illustrates yet another embodiment of an inrush minimizing apparatus 500. In that embodiment, the apparatus 500 has two microcontrollers like the apparatus 400 illustrated in FIG. 4 and includes a clock input 558 to the secondary microcontroller 550 from a primary microcontroller 502 clock output 534. The apparatus 500 also has an energize signal provided from primary microcontroller 502 output 534 to the secondary microcontroller 550 input 552 and a de-energize signal provided from primary microcontroller 502 de-energize output 532 to the relay 504, which may operate similarly to signals used in the apparatus 400 illustrated in FIG. 4.

The secondary microcontroller 550 may receive a crystal-controlled clock signal transmitted from the primary microcontroller 502 timing output 536 at its clock input 558. The secondary microcontroller 550 can use that clock signal to calculate a delay in energizing the relay 504 to a finer resolution than the embodiment 400 illustrated in FIG. 4 wherein the secondary microcontroller 450 does not receive a clock signal, thereby allowing the relay 404 closure time relative to the zero-crossing to be accomplished more precisely.

The inrush minimizing apparatus 500 of FIG. 5 includes the microcontroller 502 coupled to the secondary microcontroller 450, the secondary microcontroller 550 delaying transfer of a load on or energize command from the microcontroller 502 to the relay 504 until a zero-crossing occurs that follows the on command from the microcontroller 502. The secondary microcontroller 550 receives a clock signal coupled to its clock input 458 and which may be transmitted from the microcontroller 502 at a clock output 536. The secondary microcontroller also receives a zero-cross signal from a zero-cross sensor 510. The secondary microcontroller 550 uses the clock signal and the zero-cross signal to determine when to energize the relay 504 so that the relay 504 is energized when the voltage to the load is low.

The secondary microcontroller 550 will receive the zero-cross signal indicating a time when a near zero voltage is present on the powerline to the load. The secondary microcontroller 550 may also have the time that elapses between zero-crossings based on the frequency of the alternation of the current provided to the load and may also include a time that elapses from the secondary microcontroller 550 transmission of a load energize signal to the actual time that the relay 504 energizes the load. The occurrence and time of a zero-cross event along with the time that elapses between zero crossings (i.e., $\frac{1}{120}^{th}$ of a second in 60 Hz power and $\frac{1}{100}^{th}$ of a second in 50 Hz power) can be used to determine when the next zero-crossing will occur. The amount of time elapsing from transmission of an energize signal to the time a load is energized can then be subtracted from the next zero-cross time and the secondary microcontroller 550 may transmit its energize output signal to the relay 504 that amount of time prior to the determined next zero-cross time to precisely energize the load at the next zero-crossing after the secondary microcontroller 550 receives a zero-cross signal. In that way, zero-cross energization of the load may be accomplished with precision.

The signal transmitted from the clock output 536 of the primary microcontroller 502 to the clock input of the secondary microcontroller 550 may be a crystal controlled time base that the secondary microcontroller 550 can use to calculate the delay from signal output to load energization to a fine resolution, thereby allowing the relay closure time relative to the zero-crossing to be determined precisely. The crystal timer is generally a device that creates an electrical signal with a precise frequency and may be the mechanism that provides the clock signal to the secondary microcontroller 550 and ensure accurate timing of transmission of the load energize signal from the secondary microcontroller.

The apparatus 500 of FIG. 5 includes the primary microcontroller 502 coupled to the secondary microcontroller 550 through resistor 518, the secondary microcontroller 550 in turn being coupled to the relay 504 through a transistor 506, a pair of diodes 512 and 514, and a resistor 522. The primary microcontroller 502 is also coupled to the relay 404 through transistor 508 and a resistor 516. The relay 504 may be coupled to a 120 VAC power source or other line voltage that may energize the load directly or may be used to energize a contactor or other apparatus for energizing the load. The secondary microcontroller 550 is also coupled to a zero-cross sensor 510 coupled to the power source for the load to provide a signal that indicates when that alternating current power source experiences a zero-voltage crossing at the secondary microcontroller 550 input 556.

In the inrush minimizing apparatus 500 illustrated in FIG. 5, the primary microcontroller 502 asserts a set signal at its load energization output 534. That set signal is received by the secondary microcontroller 550 at its load energization input 552. The secondary microcontroller 550 does not, however, assert the set signal to the relay 504 (or to the base of transistor 506) from the secondary microcontroller 550 energization output 554 until after the leading edge of a zero-cross signal is received from the zero-cross sensor 510 at the zero-cross input 556 of the secondary microcontroller 550. The secondary microcontroller 550 transmits a relay 504 actuation signal at a time after receiving the load energization signal at input 552 and the zero-cross signal at zero-cross input 556 and furthermore transmits the relay 504 actuation signal an amount of time before the next zero crossing approximately equal to the actuation delay time for the load to energize from the time the load energization signal is transmitted from the secondary microcontroller 550.

In embodiments of an inrush power reduction device 500, the device secondary microcontroller 550 includes instructions which, when executed by the secondary microcontroller 550, cause the secondary microcontroller 550 to perform functions. Those functions may include determining a time of a zero-cross low voltage event sensed by the zero-cross sensor 510 and transmitted to the secondary microcontroller 550 zero-cross input 556 from the zero-cross sensor 510. The secondary microcontroller 550 may also calculate a time of a later zero-cross low voltage event based on the time of a recent zero-cross event and a multiple of half the frequency of the fluctuation of the voltage to the load. The secondary microcontroller 550 may set the load energize output 554 of the secondary microcontroller 550, thereby energizing the relay 504, after the secondary microcontroller 550 receives an energize signal at its energize signal input 552 from the energize output 534 of the primary microcontroller 502, after the secondary microcontroller 550 receives a zero-cross signal at its zero-cross input 556 from the zero-cross voltage sensor 510, and prior to a later zero-cross low voltage event by an amount of time it takes for a load to energize from the time the load energize output 554 is set. Moreover, the amount of time it takes for a load to energize from the time the load energize output is set may be a predetermined amount of time and may be known by the equipment employed or may be measured for a particular purpose or installation.

While specific embodiments of the invention have been described in detail, it should be appreciated by those skilled in the art that various modifications and alternations and applications could be developed in light of the overall teachings of the disclosure. Accordingly, the particular arrangements, apparatuses, and methods disclosed are meant to be illustrative only and not limiting as to the scope of the invention.

What is claimed is:

1. An inrush power reduction device, comprising:
   a primary microcontroller having an energize output, a de-energize output, and a clock output;
   a secondary microcontroller having an energize input coupled to the primary microcontroller energize output, a clock input coupled to the primary microcontroller clock output, a zero-cross input, and a load energize output;
   a relay coupled to the de-energize output of the primary microcontroller and the energize output of the secondary microcontroller, and to be coupled to energize a load; and
   a zero-cross voltage sensor coupled to sense the voltage of power provided to the load and providing an output indicative of a low voltage on the load power, the output coupled to the zero-cross input of the secondary microcontroller.

2. The inrush power reduction device of claim 1, wherein the zero-cross sensor senses a low voltage state in an alternating current power line.

3. The inrush power reduction device of claim 1, wherein the secondary microcontroller contains a time for a load to be energized from the time the secondary microcontroller provides an energize signal at its energize output.

4. The inrush power reduction device of claim 1, wherein the de-energize signal from the primary microcontroller resets the relay to an open position.

5. The inrush power reduction device of claim 1, wherein the energize signal from the secondary microcontroller sets the relay thereby energizing a ballast.

6. The inrush power reduction device of claim 1, wherein the clock output is a crystal controlled clock signal.

7. The inrush power reduction device of claim 1, wherein the secondary microcontroller includes instructions which, when executed by the secondary microcontroller, cause the secondary microcontroller to:
   determine a time of a zero-cross low voltage event sensed at the secondary microcontroller zero-cross input;
   calculate a time of a later zero-cross low voltage event based on the time of a recent zero-cross event and the frequency of the fluctuation of the voltage to the load; and
   set the load energize output of the secondary microcontroller, thereby energizing the relay, after the secondary microcontroller receives an energize signal from the energize output of the primary microcontroller, after the secondary microcontroller receives a zero-cross signal from the zero-cross voltage sensor, and prior to the later zero-cross low voltage event by an amount of time it takes for a load to energize from the time the load energize output is set.

8. The inrush power reduction device of claim 7, wherein the later zero-cross low voltage event occurs a multiple of half the frequency of the load power alternation added to a prior sensed zero-crossing time.

9. The inrush power reduction device of claim 7, wherein the amount of time it takes for a load to energize from the time the load energize output is set is predetermined.

10. A method of controlling power inrush to a load, comprising:
    transmitting a load energization signal from a primary microcontroller to a secondary microcontroller;
    transmitting a zero-cross voltage signal from a zero-cross sensor coupled to the load power to the secondary microcontroller; and
    transmitting an energize signal from the secondary microcontroller to a relay after the secondary microcontroller receives an energize signal from the energize output of the primary microcontroller, after the secondary microcontroller receives a zero-cross signal from the zero-cross voltage sensor, and prior to the later zero-cross low voltage event by an amount of time it takes for a load to energize from the time the load energize output is set.

11. The method of controlling power inrush to a load of claim 10, further comprising transmitting a clock signal from the primary microcontroller to the secondary microcontroller.

12. The method of controlling power inrush to a load of claim 10, further comprising transmitting a load de-energization signal from the primary microcontroller to the relay.

13. The method of controlling power inrush to a load of claim 10, wherein the zero-cross sensor senses a low voltage state in an alternating current power wire attached to the load.

14. The method of controlling power inrush to a load of claim 10, further comprising:
- determining a time of a zero-cross low voltage event sensed at the secondary microcontroller zero-cross input;
- calculating a time of a later zero-cross low voltage event based on the time of a recent zero-cross event and the frequency of the fluctuation of the voltage to the load; and
- setting the load energize output of the secondary microcontroller, thereby energizing the relay, after the secondary microcontroller receives an energize signal from the energize output of the primary microcontroller, after the secondary microcontroller receives a zero-cross signal from the zero-cross voltage sensor, and prior to the later zero-cross low voltage event by an amount of time it takes for a load to energize from the time the load energize output is set.

15. An inrush power reduction device, comprising:
- a microcontroller having a latch activation output, a load energization output, and a load de-energization output;
- a logic latch having an activation input coupled to the microcontroller latch activation output, a load energization input coupled to the microcontroller load energization output, having a zero-cross input, and having a load energization output;
- a relay coupled to the de-energization output of the microcontroller and the energization output of the logic latch, and to be coupled to energize a load; and
- a zero-cross voltage sensor to be coupled to sense the voltage of power provided to the load and provide an output indicative of a low voltage on the load power, the output coupled to the zero-cross input of the logic latch.

16. The inrush power reduction device of claim 15, wherein the logic latch is a D latch.

17. The inrush power reduction device of claim 15, wherein the load is energized by a first assertion of a low level on the latch activation input followed by an assertion of a high level on the load energization input.

18. The inrush power reduction device of claim 15, wherein the de-energize signal from the microcontroller resets the relay to an open position.

19. The inrush power reduction device of claim 18, wherein the load energization output transmitted from the logic latch sets the relay to a closed position.

20. The inrush power reduction device of claim 19, wherein the relay is a latching relay.

\* \* \* \* \*